Dec. 28, 1926. 1,612,601
G. BAYONA
PNEUMATIC TIRE PROTECTOR
Filed Feb. 19, 1926
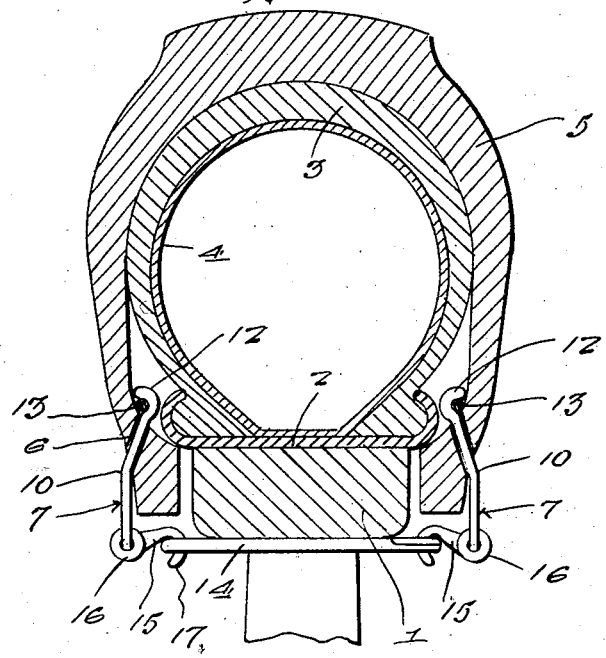
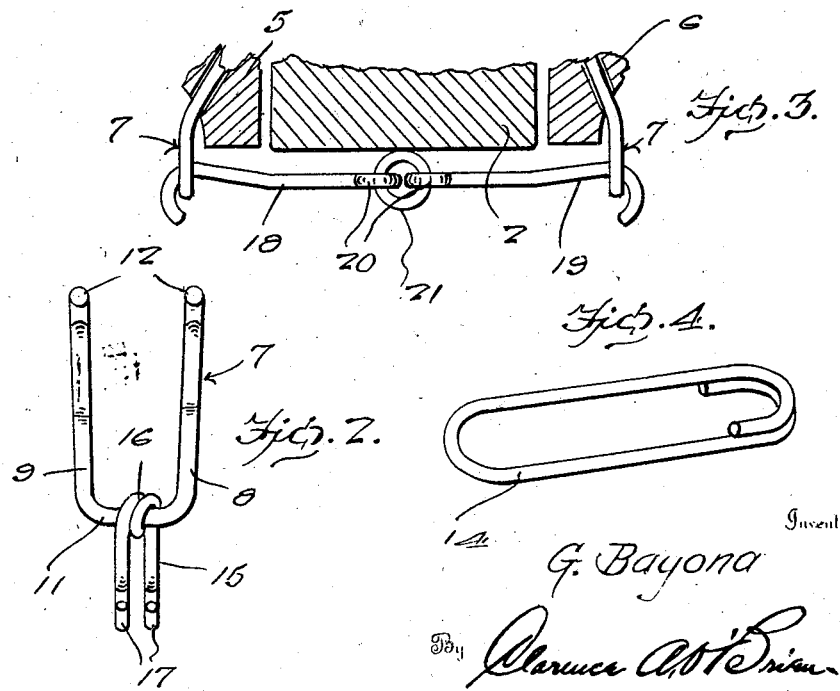
Inventor
G. Bayona
By Clarence A. O'Brien
Attorney Patented Dec. 28, 1926.

1,612,601

UNITED STATES PATENT OFFICE.

GENARO BAYONA, OF SAN DIEGO, CALIFORNIA.

PNEUMATIC-TIRE PROTECTOR.

Application filed February 19, 1926. Serial No. 89,376.

This invention relates to a protector for pneumatic tires, and comprises an outer protector casing which encloses the outer casing of the pneumatic tire so that the inner tube will be protected against punctures by tacks, nails, or other sharp obstacles.

One of the important objects of the present invention is to provide a means for securing the protector casing on the tire casing so that the protector casing will at all times be secured in proper position on the pneumatic tire, the fastening means being so associated with the protector casing and the wheel of the vehicle on which the pneumatic tire is mounted as not to injure the tire casing.

A still further object is to provide a pneumatic tire protector which may be readily and easily attached or detached, the same being further simple in construction, inexpensive, and furthermore adapted to the purposes for which the same is designed.

Other objects and advantages of this invention will become apparent during the course of the following description.

In the accompanying drawing forming part of this specification and in which like numerals are employed to designate like parts throughout the same:

Figure 1 is a central view through a portion of a vehicle wheel showing a pneumatic tire mounted therein and my improved protector associated with the wheel and pneumatic tire.

Fig. 2 is a detail side elevation of one of the U-shaped members and the hook associated therewith.

Fig. 3 is a fragmentary view showing a modification of the transversely extending securing means, and Fig. 4 is a detail perspective view of the link.

In the drawing wherein for the purpose of illustration is shown the preferred embodiment of my invention, the numeral 1 designates the felly of an automobile wheel of the conventional construction, and mounted on the felly in the usual manner is the rim 2, for supporting a pneumatic tire, the latter comprising an outer tire casing 3 and the inner tube 4. My improved pneumatic tire protector comprises the protector casing 5 which is formed of rubber and made either to consist of a new or worn tire casing, or may furthermore consist of a series of segmental sections of a worn tire casing.

In the manner as shown more clearly in Fig. 1 of the drawing, the protector casing 5 completely envelopes the pneumatic tire casing 3 so that the inner tube 4 will be protected against being punctured by tacks or other sharp obstacles which may pierce the pneumatic tire casing, it being first necessary for such penetrating elements to initially come in contact with the protector casing 5 before reaching the pneumatic tire. The free edges or bead portions of the protector casing 5 extend inwardly beyond the rim 2 and are disposed adjacent the respective sides of the felly 1 as is also clearly illustrated in the drawings.

The casing 5 is provided at spaced intervals with the diagonally disposed openings 6, the same being formed adjacent the edges of the protector casing. For the purpose of accommodating the U-shaped members 7, these openings 6 are arranged in pairs so that the arms 8 and 9 of each of the U-shaped members will extend upwardly through the pairs of openings. The intermediate portions of the arms of each U-shaped member are slightly bent as indicated at 10 so that the lower portions of the arms will be disposed adjacent the marginal edges of the protector casing. The crown portion 11 of each of the U-shaped members is disposed beyond the edge or in the circumference of the protector casing and the purpose of this arrangement will be presently apparent.

Outwardly turned hooks 12 are formed on the upper free ends of the arms of each of the U-shaped members, and the same cooperate with the inner sides of the protector casing 5 in receiving the circumferentially extending wires 13 as is obvious from the construction shown in Fig. 1. There is sufficient space within the protector casing 5 adjacent the free edges thereof to accommodate the hooks and the circumferentially extending wires 13 so that the hooks will not come in contact with the pneumatic tire and thus injure the same.

For the purpose of securing the protector casing 5 in position on the pneumatic tire to further prevent circumferential movement of the protector casing, with respect to the pneumatic tire, I provide a series of links such as are shown at 14 in Fig. 4 of the drawings, each of said links adapted to be disposed between an adjacent pair of spokes of the vehicle wheel and further adapted to lie flush against the inner face of the felly 1 and extend transversely with respect thereto, so that the ends of each link will project beyond the respective sides of the felly as clearly shown in Fig. 1. A hook designated generally by the numeral 15 is formed of a single strand of wire and has its intermediate portion looped, as at 16 to provide a pivotal connection between the hooks and the crown or base portion 11 of each of the U-shaped members 7, the free ends of the bar being disposed in parallel spaced relation and bent to form the link engaging hooks 17.

The opposed pairs of hooks are associated with each pair of opposed U-shaped members and will have their hooked ends 17 engaging the respective ends of the link 14 and when the parts are arranged as shown in Fig. 1, the protector casing 5 is secured in position around the pneumatic tire so that circumferential movement of the protector casing will be prevented as well as lateral or side movement.

In Fig. 3 of the drawing, a modification is shown wherein a pair of complementary hooks 18 and 19 have their interopposed ends associated with eyes 20 through which extends a connecting ring 21, these hooks extending laterally from the inner face of the felly 2, and the outer hooked ends of these hooks engaged with the crown portions of the opposed pair of U-shaped members 7. A rope may also be employed in connection with the hooks 15 in place of the link 14.

The provision of a protector of the above mentioned character will prolong the life of a pneumatic tire and will permit a tire casing to be used even after the same has become badly worn. It is a well known fact that as soon as a tire casing becomes worn to an appreciable extent, it is necessary to remove the worn casing and replace the same with a new one in order to protect the inner tube against punctures by small tacks and the like. However, the provision of a protector casing of the character embodied in my invention will, as before mentioned, increase the durability of a pneumatic tire casing.

The simplicity with which my device is constructed, enables the same to be readily and easily attached or detached and will not in any way interfere with the inflation of the pneumatic tire inner tube nor will it be necessary to alter the vehicle wheel to accommodate the tire protector.

While I have shown the preferred embodiment of my invention, it is to be understood that various changes in the size, shape and arrangement of parts may be resorted to without departing from the spirit or sacrificing any of the advantages of the appended claims.

Having thus described my invention, what I claim as new is:—

1. The combination with a pneumatic tire mounted on an automobile wheel, of a protector casing therefor enveloping the pneumatic tire, and securing means for the protector casing comprising a series of U-shaped members arranged in pairs, the upper ends of the arms of each U-shaped member extending through the sides of the protector casing, a pair of wires extending circumferentially within the protector casing adjacent the inner faces of the respective sides thereof, hooks formed on the upper ends of the arms of each U-shaped member adapted to engage the respective circumferentially extending wires, and means for securing the crown portions of each pair of U-shaped members together.

2. The combination with a pneumatic tire mounted on an automobile wheel, of a protector casing therefor enveloping the pneumatic tire, and securing means for the protector casing comprising a series of U-shaped members arranged in pairs, the upper ends of the arms of the U-shaped member extending through the sides of the protector casing, a pair of wires extending circumferentially within the protector casing adjacent the inner faces of the respective sides thereof, hooks formed on the upper ends of the arms of each U-shaped member adapted to engage the respective circumferentially extending wires, means for securing the crown portions of each pair of U-shaped members together, said means comprising a pair of complementary hooks associated with the crown portions of each pair of U-shaped members, and a connection between the inner opposed ends of said last mentioned hooks.

3. The combination with a pneumatic tire mounted on an automobile wheel, of a protector casing therefor enveloping the pneumatic tire, said protector casing having a series of openings formed therein adjacent the marginal edges thereof and arranged in pairs, a series of substantially U-shaped members, the upper ends of the arms thereof extending through one pair of openings formed in the protector casing, said U-shaped members being arranged in pairs, a wire extending circumferentially within the protector casing adjacent the inner face of each of the sides, hooks formed on the upper free ends of the arms of each U-shaped member adapted to engage the respective circumferentially extending wires, the crown portions of the U-shaped members projecting beyond the inner circumferential edges of the protector casing, hooks associated with the crown portions of each pair of opposed U-shaped members, and a connection between the inner opposed ends of each pair of hooks disposed adjacent the inner face of the felly of the automobile wheels.

In testimony whereof I affix my signature.

GENARO BAYONA.